(12) United States Patent
Phillips

(10) Patent No.: US 7,832,859 B2
(45) Date of Patent: Nov. 16, 2010

(54) CONTACT LENS AND METHOD

(75) Inventor: John R. Phillips, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 33 days.

(21) Appl. No.: 12/073,696

(22) Filed: Mar. 7, 2008

(65) Prior Publication Data
US 2008/0218687 A1 Sep. 11, 2008

(30) Foreign Application Priority Data
Mar. 9, 2007 (NZ) .................... 553763

(51) Int. Cl.
*G02C 7/04* (2006.01)
(52) U.S. Cl. .................. 351/161; 351/160 R
(58) Field of Classification Search ............ 351/160 R, 351/161
See application file for complete search history.

(56) References Cited

U.S. PATENT DOCUMENTS

| | | | |
|---|---|---|---|
| 4,618,228 A | 10/1986 | Baron et al. | |
| 4,704,016 A | 11/1987 | De Carle | |
| 4,890,913 A | 1/1990 | De Carle | |
| 5,002,382 A | 3/1991 | Seidner | |
| 5,024,517 A | 6/1991 | Seidner | |
| 5,349,393 A | 9/1994 | Kreft | |
| 5,448,312 A | 9/1995 | Roffman et al. | |
| 5,485,228 A | 1/1996 | Roffman et al. | |
| 5,898,473 A | 4/1999 | Seidner et al. | |
| 5,929,969 A | 7/1999 | Roffman | |
| 6,045,578 A | 4/2000 | Collins et al. | |
| 6,752,499 B2 * | 6/2004 | Aller | 351/247 |
| 7,025,460 B2 | 4/2006 | Smitth et al. | |
| 7,401,922 B2 | 7/2008 | Legerton | |
| 7,503,655 B2 | 3/2009 | Smith, III et al. | |
| 7,665,842 B2 | 2/2010 | Ho et al. | |
| 2001/0033363 A1 | 10/2001 | Chateau et al. | |
| 2003/0058404 A1 | 3/2003 | Thorn et al. | |
| 2003/0058407 A1 | 3/2003 | Aller | |
| 2004/0237971 A1 | 12/2004 | Radhakrishnan et al. | |
| 2005/0099597 A1 | 5/2005 | Sandstedt et al. | |
| 2006/0232743 A1 | 10/2006 | Legerton | |
| 2007/0296916 A1 | 12/2007 | Holden et al. | |

(Continued)

FOREIGN PATENT DOCUMENTS

EP    0 742 463 A2    11/1996

(Continued)

OTHER PUBLICATIONS

Zhu, X., et al; "Potency of Myopic Defocus in Spectacle Lens Compensation"; *Investigative Ophthalmology of Visual Science*; vol. 44, No. 7, pp. 2818-2827 (2003).

(Continued)

*Primary Examiner*—Joseph Martinez
*Assistant Examiner*—James R Greece
(74) *Attorney, Agent, or Firm*—Nixon & Vanderhye

(57) ABSTRACT

Contact lenses and methods for preventing or slowing progression of myopia are described. The contact lenses include a vision correction area and a myopic defocus area. Various examples of the contact lenses are described. Methods include providing the present contact lenses, or applying one or more of the contact lenses to an eye or eyes of a person. The contact lenses and methods are particularly useful in children.

16 Claims, 3 Drawing Sheets

U.S. PATENT DOCUMENTS

| | | |
|---|---|---|
| 2008/0291393 A1 | 11/2008 | Menezes |
| 2009/0161065 A1 | 6/2009 | Smith, III et al. |
| 2009/0303442 A1 | 12/2009 | Choo et al. |

FOREIGN PATENT DOCUMENTS

| | | |
|---|---|---|
| EP | 0 742 464 A2 | 11/1996 |
| WO | WO 99/66366 | 12/1999 |
| WO | WO 2004/068214 A1 | 8/2004 |
| WO | WO 2004/113959 A2 | 12/2004 |
| WO | WO 2006/034652 A1 | 4/2006 |
| WO | WO 2007/146673 A2 | 12/2007 |
| WO | WO 2008/131479 | 11/2008 |
| WO | WO 2008/131479 A1 | 11/2008 |
| WO | WO 2009/129528 | 10/2009 |
| WO | WO 2009/129528 A1 | 10/2009 |
| WO | WO 2009/152582 A1 | 12/2009 |

OTHER PUBLICATIONS

Chung, K., et al; "Undercorrection of myopia enhances rather than inhibits myopia progression"; *Vision Research*; vol. 42; pp. 2555-2559 (2002).

Wallman, J., et al; "Might myopic defocus prevent myopia?"; *Proceedings of the Eighth International Conference on Myopia*; pp. 138-142.

Choo, J.D., et al; "The Prevention of Myopia with Contact Lenses"; *Eye & Contact Lens*; vol. 33, No. 6; pp. 371-372 (2007).

Khoo, et al; "Methodologies for Interventional Myopia Studies"; *Annals Academy of Medicine*; vol. 35, No. 4, pp. 282-286 (2006).

Saw, S.M., et al; "Is it Possible to Slow the Progression of Myopia?"; *Annals of Academy of Medicine*; vol. 33, No. 1; pp. 4-6 (2004).

Smith III, E.L., et al; "Peripheral Vision Can Influence Eye Growth and Refractive Development in Infant Monkeys"; *Investigative Ophthalmology & Visual Science*; vol. 46, No. 11; pp. 3965-3972 (2005).

Smith III, E.L., et al; "The role of optical defocus in regulating refractive development in infant monkeys"; *Vision Research*; vol. 39, pp. 1415-1435 (1999).

Aller, T.A., et al; "Results of a one-year prospective clinical trial (CONTROL) of the use of bifocal soft contact lenses to control myopia progression"; *Ophthal, Physiol, Opt.* 26 (Suppl 1): 1-67 (2006).

* cited by examiner

CONTACT LENS AND METHOD

FIELD OF INVENTION

The invention relates to contact lenses and methods for preventing or slowing myopia progression.

BACKGROUND

Myopia (also called short-sight) is a common ocular condition in which distant objects appear blurred whereas near objects are seen clearly. Myopia often develops during childhood and typically increases in severity (requiring progressively stronger spectacles to correct it) until early adulthood, although the final amount of myopia that develops will vary between individuals.

Myopia is generally characterised by an abnormal enlargement of the eye-ball which has the effect of moving the light-sensitive tissue (the retina in the back of the eye) out of the focal plane of the optical components of the eye. Thus, images of distant objects are brought to focus in front of the retina, rather than in the plane of the retina. Images of distant objects are therefore seen as blurred. In high levels of myopia, the marked enlargement of the eye-ball also results in a stretching of the retina and its associated blood supply, which renders the eye more susceptible to retinal detachment, glaucomatous damage and degenerative myopic retinopathy.

The aetiology of myopia is poorly understood. Both genetic and environmental factors have been implicated and in susceptible individuals myopia progression is thought to be associated with excessive near work (eg reading, writing/drawing, playing video games, and similar), possibly because the prolonged muscular effort of focussing the eyes at near (accommodation) results in a lag of accommodation (insufficient accommodation) and hyperopic retinal de-focus. The correction of myopia requires minus-powered lenses which demand a greater accommodative effort for near work than is required without the lenses. This greater effort (and thus greater accommodative lag) has been implicated in exacerbating myopia progression.

International patent application WO2006/004440 discloses a method and contact lens for prevention of myopia progression. The contact lens includes a vision correction area for correcting in use the myopic vision of a wearer to present a clear image to the wearer during distance viewing, and during near viewing with accommodation by the eye during near viewing, and a myopic defocus area to also simultaneously present a myopic defocused image during both distance and near viewing (with accommodation by the eye during near viewing). The myopic retinal de-focus inhibits the abnormal axial elongation of the eyes that underlies myopia progression, with the effect that over time the progression of myopia slows, stops, or reverses.

SUMMARY OF INVENTION

In broad terms in one aspect, the invention comprises a contact lens including a vision correction area for correcting in use the myopic vision of a wearer and a myopic de-focus area for simultaneously in use presenting a myopic de-focused image to the wearer, in which one of the vision correction area and the myopic de-focus area comprises a central zone of the contact lens and the other of the myopic de-focus area and the vision correction area comprises a second zone around said central zone.

Preferably the vision correction area comprises the central zone of the lens and a myopic de-focus area comprises a zone around said central zone.

In broad terms in another aspect, the invention comprises a method of treating or slowing the progression of myopia in a person, which includes applying to the eye(s) of the person or prescribing for the person, a contact lens or lens(es) each including a vision correction area for correcting in use the myopic vision of a wearer, and a myopic de-focus area which simultaneously in use presents a myopic defocused image to the wearer, one of the vision correction area and the myopic de-focus area comprising a central zone of the contact lens and the other of the myopic de-focus area and the vision correction area comprises a second zone around said central zone.

In broad terms in a further aspect, the invention comprises contact lens including a vision correction area having a negative focal power to correct the myopic vision of a wearer to present a clear image to the wearer during distance viewing, and during near viewing with accommodation by the eye during near viewing, and a myopic defocus area having a focal power which is less negative than the negative focal power of the vision correcting area to also simultaneously present a myopic defocused image during both distance and near viewing, with said accommodation by the eye during near viewing, one of the vision correction area and the myopic de-focus area comprising a central zone of the contact lens and the other of the myopic de-focus area and the vision correction area comprising a second zone around said central zone.

In broad terms in a further aspect, the invention comprises a contact lens including a first area to present a clear image to the wearer during distance viewing, and during near viewing with accommodation by the eye during near viewing, and a second area having a relatively less negative focal power to also simultaneously present a myopic defocused image during both distance and near viewing (with said accommodation by the eye during near viewing), one of said first and said second areas comprising a central zone of the contact lens and the other comprising a second zone around said central zone.

In broad terms in a further aspect, the invention comprises a method of inhibiting the development of myopic vision in a person, comprising applying to the eye(s) of the person, a contact lens or lens(es) each including a first area which provides a clear retinal image during near viewing with accommodation by the eye during near viewing, and a second area which simultaneously in use presents a myopic defocused image to the wearer during both distance and near viewing (with said accommodation by the eye during new viewing), to thereby present to the eye(s) of the wearer a clear retinal image and a myopic defocused image during both distance and near viewing.

In one preferred method, two lenses that have identical or substantially identical designs or configurations are applied to the person.

Another method of treating or slowing progression of myopia in a person, such as a child (e.g., a person under the age of 18) includes a step of providing a pair of the contact lenses described herein. The providing can be performed by a contact lens manufacturer to a distributor or lens wearer, a contact lens distributor to a doctor or a lens wearer, or by a doctor to a lens wearer.

In a preferred form, the second zone of the contact lens is surrounded by a third zone which preferably comprises part of the vision correction area if the central zone is a vision correction area, or which comprises part of the myopic de-focus area if the central zone is a myopic de-focus area. Preferably the third zone is then surrounded by a fourth zone which preferably comprises part of the myopic de-focus area if the second zone is a myopic de-focus area, or which comprises part of the vision correction area if the second zone is a vision correction area. The fourth zone may optionally be surrounded by a fifth zone which is part of the vision correction area if the first and third zones are vision correction areas, or which is part of the myopic de-focus area if the first and third zones are myopic de-focus areas.

Preferably the zones of the lens comprise concentric zones each having a circular outer peripheral limit The focal power of the myopic de-focus area(s) of the lens may be up to 5 dioptres less negative than the focal power of the vision correction area, between about 1 and about 3 dioptres less negative, and may be about 2 dioptres less negative for example, than the focal power of the vision correction area.

In one form of the lens, the diameter across the first and second zones is approximately equal to the diameter of the pupil of the eye of persons in the age range 10 to 15 years under photopic conditions (e.g. 10 to 100 $cd/m^2$). Preferably the diameter across the first to fourth zones is approximately equal to the diameter of the pupil of the eye of persons in the age range 10 to 15 years under mesopic conditions (e.g 0.01 to 10 $cd/m^2$).

In another form of the lens, the diameter across the first and second zones is approximately equal to the diameter of the pupil of the eye of persons in the age range 16 to 30 years under photopic conditions (e.g. 10 to 100 $cd/m^2$). Preferably the diameter across the first to fourth zones is approximately equal to the diameter of the pupil of the eye of persons in the age range 16 to 30 years under mesopic conditions (e.g 0.01 to 10 $cd/m^2$)

Preferably where the central zone is a vision correction zone it is of a diameter sufficient to achieve 6/6 (Snellen) vision under photopic conditions.

Preferably diameter of the central zone is at least 2.2 millimeters, more preferably at least about 2.35 millimeters or at least about 2.5 millimeters, and may optimally be between about 2.6 and 2.7 millimeters.

Preferably the diameter of the second zone is at least about 3.3 millimeters, more preferably at least about 3.5 millimeters, or at least about 3.7 millimeters, and may optimally be between about 3.7 and 3.8 millimeters.

Preferably the diameter of the third zone is less than about 5.8 millimeters, more preferably less than about 5.5 millimeters, and may be between about 5 and 5.5 millimeters and optimally about 5.3 millimeters.

Preferably the diameter of the fourth zone is less than about 7 millimeters, more preferably less than about 6.7 millimeters, and may be between 6 and 6.7 millimeters and optimally about 6.5 millimeters.

Preferably the diameter of the fifth zone is greater than about 8 millimeters, more preferably greater than about 8.5 millimeters, and may be about 9 millimeters.

The central and second zones may have approximately equal areas. The third and fourth zones may have approximately equal areas.

Preferably, the vision correction area comprises at least about 65% of the total area of the operative optic part of the lens, more preferably at least about 70%, and most preferably between about 70-80%, and typically about 75% of the operative optical part of the lens. The operative optic part of the lens excludes any outermost peripheral part of the lens substantially beyond the pupil when maximally dilated, such as an outermost carrier zone commonly provided to assist in physically locating the lens on the eye ball but which performs no optical function. Preferably the operative optic part of the lens has a diameter in the range from 7-11 millimeters, such as from 8-10 millimeters, preferably at least 8.5 millimeters, and most preferably about 9 millimeters.

In broad terms in a further aspect, the invention comprises a contact lens, comprising:

an optic zone and a carrier zone circumscribing the optic zone, the optic zone comprising a vision correction area and a myopic defocus area, wherein the vision correction area constitutes at least 65% of the area of the optic zone, and the myopic defocus area constitutes no more than 35% of the area of the optic zone.

In broad terms in a further aspect, the invention comprises a contact lens, comprising:

an optic zone and a carrier zone circumscribing the optic zone, the optic zone comprising a vision correction area and a myopic defocus area, wherein the optic zone has an optic zone diameter greater than 7 mm and less than about 11 mm.

The contact lens and method of the invention are aimed at slowing myopia progression in humans, in particular in children and young adults. It is possible that the lens may prove to stop myopia progression. In patients with a pre-existing myopic refractive error, the lens corrects pre-existing myopic refractive error (allowing the wearer to see distant objects clearly, as a normal contact lens), and simultaneously provides an optical treatment to slow the progression of myopia by including a myopic de-focus area or 'treatment zone' which applies a controlled myopic de-focus to the retina both when the wearer is viewing in the distance and also when viewing at near. The optical treatment consists of continuous myopic retinal de-focus which is created by the contact lens both during distance and near viewing. A focussed retinal image and a myopic defocused retinal image during both distance and near viewing are simultaneously presented to the eye(s) of the wearer.

The contact lenses and methods may be employed in relation to persons without myopia but who are considered to be predisposed to develop in myopia, due to genetic or environmental factors for example. A lens of the invention for use in such an application comprises a first area having a neutral or low positive optical power, to present a clear image to the non-myopic wearer during distance viewing, and during near viewing with accommodation by the eye during near viewing, and a second or myopic de-focus area having a less negative i.e. positive focal power to also simultaneously present a myopic de-focussed image during both distance and near viewing (with said accommodation by the eye during near viewing). One of said first and said secondary areas comprises a central zone of the contact lens and the other comprises a second zone around said central zone. The method in this application comprises providing to a person who is non-myopic but considered to be predisposed to development of myopia, such a contact lens or lenses. For example, the method may comprise providing one or two of the present contact lenses to a person who has two biological parents who are myopic.

The invention also includes use, in the manufacture of a contact lens system or kit for treating, slowing, or preventing the progression of myopia, or for preventing the development of myopia, in a myopic subject or non-myopic subject, of one or more contact lenses which may be the same or different, at least one of which is as defined above.

The invention also includes a method of correcting myopic vision while causing lens-induced functional emmetropia in a person, which includes applying to at least one of the person's eyes a contact lens as defined above for correcting in use the myopic vision of the person and simultaneously presenting in use a myopic defocused image to the person.

The invention also includes use of a contact lens as defined above, for the technical purpose of correcting a person's myopic vision causing lens-induced functional emmetropia on application of the contact lens to the person's eye.

Various embodiments of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

BRIEF DESCRIPTION OF THE FIGURES

The invention is further described with reference to the accompanying Figures, by way of example and without intending to be limiting, in which.

DETAILED DESCRIPTION OF PREFERRED FORM

Figure 1:
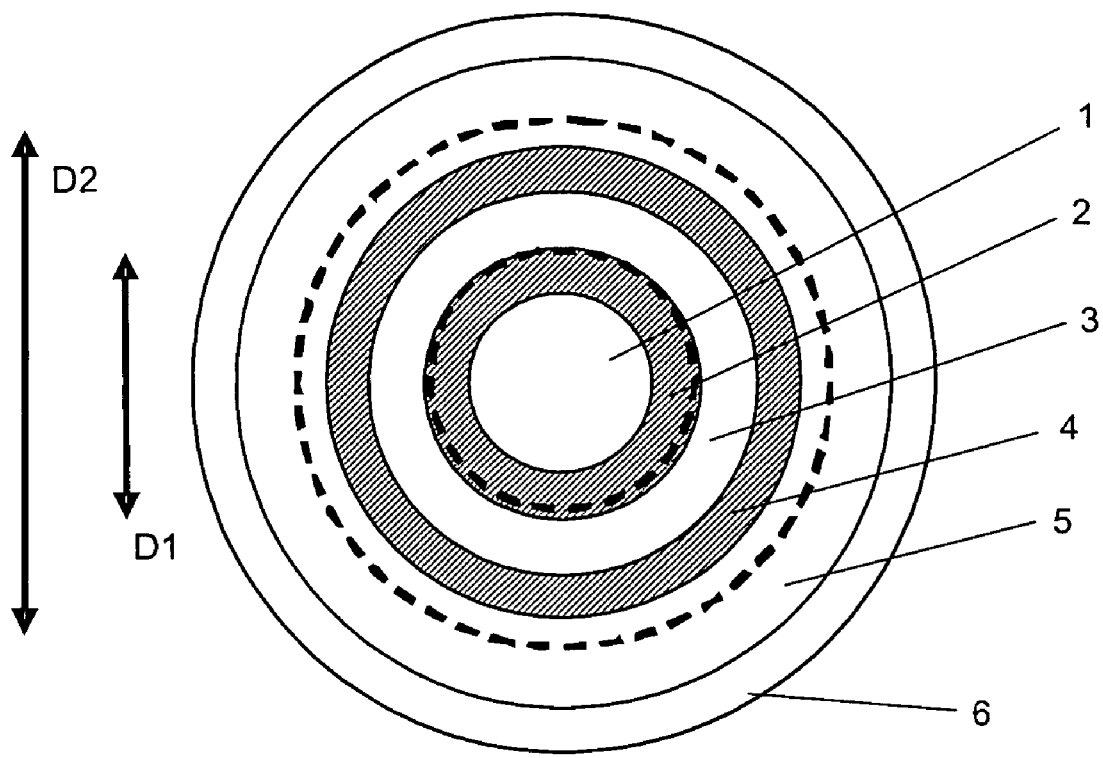
FIG. 1 schematically illustrates a preferred embodiment of a contact lens of the invention from the front.

Referring to FIG. 1 the preferred form of contact lens shown comprises a correction area which includes a central zone indicated at 1 which has a focal length or negative focal power to correct existing myopic vision of a wearer. The lens also comprises a treatment area which includes a second zone 2 around the central zone 1 and having a relatively less negative focal power than the correction area 1, which will simultaneously present a myopic defocused image to the wearer during both distance and near viewing, and which is referred to herein as a treatment zone or zone for convenience. When viewing the anterior surface of the lens along the central optic axis of the lens, as shown in FIG. 1, the central zone 1 is circular in shape, and the second zone 2 has an annular or ring-like shape circumscribing the central zone 1, and is concentric with the central zone 1.

The treatment area may be up to 5 dioptres less negative in focal power than the correction area, more likely between 1 and 3 dioptres less negative and typically about 2 dioptres different. In one embodiment of the invention, if the correction area for a particular subject with only mild myopia has a low negative focal power such as only 1 dioptre negative for example, then it is possible that the treatment area may have a neutral or low positive focal power. In another embodiment the treatment area has a neutral or negative but not a positive focal power. In a further embodiment the treatment area always has a negative focal power (though less negative than that of the correction area). As one example, a contact lens having a vision correction area with a refractive power of –5 dioptres may have a treatment area with a refractive power of –3 dioptres. In this example, the difference is about 2 dioptres. As another example, a contact lens having a vision correction area with a refractive power of –3 dioptres may have a treatment area with a refractive power of –1 dioptres. In this example, the difference is about 2 dioptres. Similar relationships may be observed in lenses having a refractive power difference between the vision correction area and the treatment area of –5 dioptres, –4 diopters, –3 dioptres, and –1 dioptres.

Alternatively but less preferably the central zone 1 may be a myopic de-focus or treatment zone and the surrounding second zone 2 the vision correction zone.

In addition, alternatively, the central zone 1 or the second zone 2 or both zones (and other zones subsequently referred to) may have non-circular shapes when viewed along the contact lens central optic axis.

In the preferred form the second zone 2 is surrounded by a third zone 3 which also comprises part of the vision correction area. The zone 3 has the same focal power as the zone 1. In turn the zone 3 is surrounded by a fourth zone 4 which comprises part of the myopic de-focus treatment area, having the same focal power as the myopic de-focus zone 2.

The zone 4 may be surrounded by a fifth zone 5 which is also vision correcting, having the same focal power as the vision correction zones 1 and 3. The zones 1 to 5 are concentric.

The lens also comprises an outermost carrier zone 6 around the zone 5 to assist in physically locating the lens on the eye ball but which performs no optical function.

In alternative forms the focal powers of some or each of the myopic de-focus zones comprising the treatment area may differ from one another, while being all less negative than the focal power of the correction area of the lens.

In alternative but less preferred forms the zones 1, 3 and 5 may be treatment zones which apply a myopic de-focus to the wearer and the zones 2 and 4 are then vision correction zones.

Preferably where the central zone is a vision correction zone it is of a diameter sufficient to correct vision under photopic conditions.

In one embodiment of the lens, the diameter indicated at D1 across the first and second zones is approximately equal to the diameter of the pupil of the eye of persons in the age range 10 to 15 years under photopic conditions. Preferably the diameter across the first to fourth zones 1 to 4 indicated approximately at D2 approaches the diameter of the pupil of the eye of persons in the age range 10 to 15 years under mesopic conditions.

In another embodiment of the lens, the diameter D1 across the first and second zones is approximately equal to the diameter of the pupil of the eye of persons in the age range 16 to 30 years, under photopic conditions. Preferably the diameter D2 across the first to fourth zones approaches the diameter of the pupil of the eye of persons in the age range 16 to 30 years under mesopic conditions.

Preferably diameter of the central zone is at least about 2.2 millimeters, more preferably at least about 2.35 millimeters or at least about 2.5 millimeters, and may optimally be between about 2.6 and 2.7 millimeters.

Preferably the diameter of the second zone is at least about 3.3 millimeters, more preferably at least about 3.5 millimeters, or at least about 3.7 millimeters, and may optimally be between about 3.7 and 3.8 millimeters.

Preferably the diameter of the third zone is less than about 5.8 millimeters, more preferably less than about 5.5 millimeters, and may be between about 5 and 5.5 millimeters and optimally about 5.3 millimeters.

Preferably the diameter of the fourth zone is less than about 7 millimeters, more preferably less than about 6.7 millimeters, and may be between about 6 and 6.7 millimeters and optimally about 6.5 millimeters.

Preferably the diameter of the fifth zone is greater than about 8 millimeters, more preferably greater than about 8.5 millimeters, and may be about 9 millimeters.

The central and second zones 1 and 2 may have approximately equal areas. The third and fourth zones 3 and 4 may have approximately equal areas.

The vision correction area comprising the central, second, and fifth zones (zones 1, 3, and 5 illustrated in FIG. 1) comprises at least about 65%, more preferably at least about 70%, most preferably between about 70-80%, and typically about 75% of the operative optic part of the lens. Preferably the operative optic part of the lens has a diameter in the range of 7-11 millimeters, preferably in the range of 8-10 millimeters, more preferably of at least 8.5 millimeters, and most preferably about 9 millimeters.

Both genetic and environmental factors have been implicated in the development of myopia. A person with one biological parent with myopia is generally considered more likely to also develop myopia than a person with neither biological parent being myopic. A person with two biological parents with myopia is generally considered more likely to also develop myopia than a person with one parent myopic. Excessive near work e.g. reading, or work at a VDU is generally considered to be a negative environmental factor. This is illustrated in the table below:

TABLE 1

| Genetic Factors | Environmental Factors? | |
|---|---|---|
| | No | Yes |
| One parent myopic | + | ++ |
| Both parents myopic | ++ | +++ |

In accordance with a method of the invention, individuals may be determined to be predisposed to the development of myopia based on the above criteria, and may be provided with contact lenses of the invention for such persons (lenses having a first area of neutral or low positive focal power and a second area of less negative i.e. more positive focal power, one of said first and second areas and preferably said first area comprising a central zone of the contact lens in the other and preferably a second area comprising a second zone around said central zone).

The lens as well as correcting myopic refractive error may also be formed to correct astigmatism. For example, the contact lenses may include a toric optical zone and provide cylindrical refractive power correction to a patient with astigmatism. The correction zone(s), or both the correction and treatment zones, may be formed with such a toric shape.

The rear face of the lens is formed so as to give the lens good stability on the eyeball against movement so that the lens, or at least the optic part, sits stably aligned over the pupil. For example, the rear face or posterior surface of the contact lens can be a bicurve surface (i.e., comprising a first posterior surface portion having a curvature of a first radius, and a second posterior surface portion having a curvature of a second different radius). In one embodiment, the rear face of the lens comprises, consists essentially of, or consists of a central area having a curvature of a first radius ($r_0$) and a peripheral area circumscribing the central area having a curvature of a second radius ($r_1$). In one embodiment, the first radius ($r_0$) is smaller than the second radius ($r_0$) there by providing a relatively steeper curvature to the central area compared to the peripheral area. In another embodiment, the first radius ($r_0$) is greater than the second radius ($r_0$) thereby providing a relatively steeper curvature to the peripheral area compared to the central area.

The lenses may be manufactured using any conventional technique known to persons of ordinary skill in the art, such as lathing, spin-cast molding, or cast molding. In certain embodiments, the present lenses are lathed hydrogel lenses, and can be manufactured by polymerizing a hydrogel lens forming composition in a tubular mold to form a polymerized polymeric cylinder. The cylinder can be processed to form contact lens buttons, which can be lathed using a CNC lathe or other similar lathing machine. The lathe is used to form the optical surfaces of the lens. Once the lathed lens is formed, the lens can be further processed, such as by washing the lenses, packaging the lenses, sterilizing the lenses, or any combination thereof. In addition, the lenses can be polished if desired to reduce transitions between regions of different curvature.

Figure 3A:
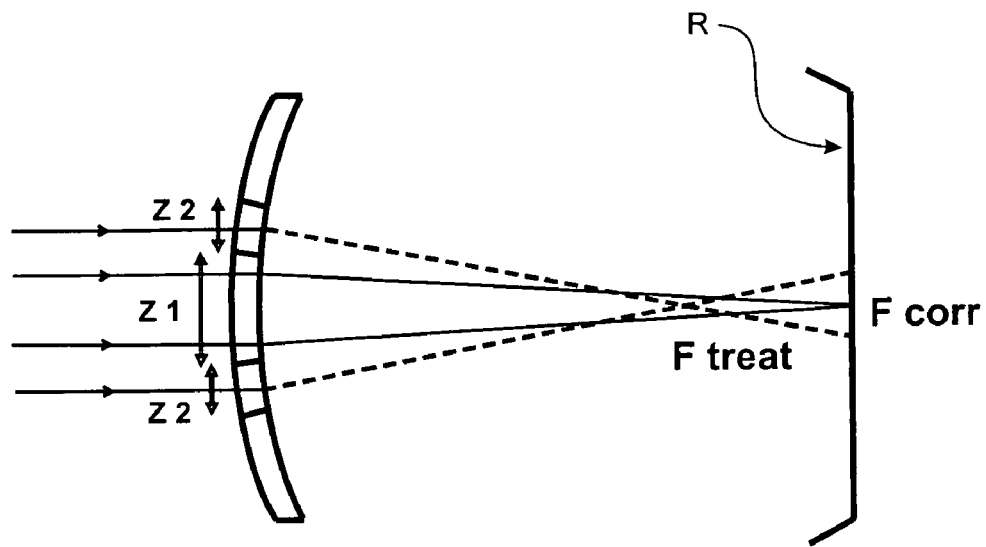
FIGS. 3a and 3b illustrate treatment of myopia progression using the contact lens of the invention.
Figure 3B:
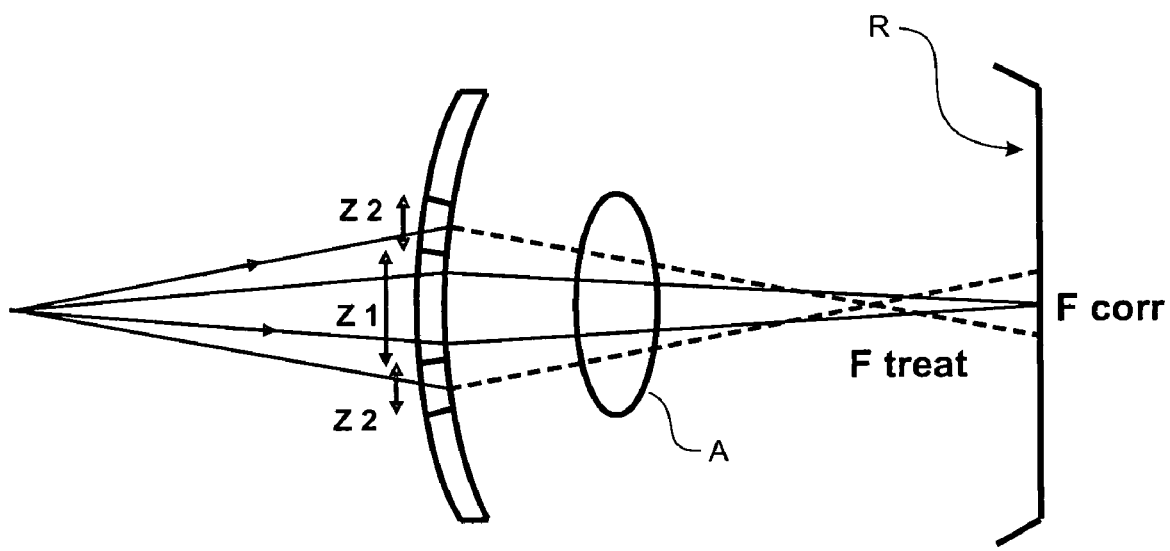

FIGS. 3a and 3b diagrammatically illustrate the effects of wearing of lenses of the invention and a method of the invention. During distance vision shown in FIG. 3a, accommodation is relaxed and images of distant objects are brought to focus on the retina R via a correction zone Z1 of the lens, giving clear distance vision. Rays passing through the correction zone Z1 are indicated in solid and rays passing through zone Z2 treatment are indicated in broken lines. Simultaneously, light from the distant objects passes through the treatment zone Z2 of the lens and is brought to focus in front of the retina, causing myopic de-focus on the retina During near vision, shown in FIG. 3b, the eyes accommodate. This is schematically illustrated in FIG. 3b by the representation of the crystalline lens A of the eye with accommodation. This accommodation brings the image transmitted through the correction area into focus on the retina. This accommodation also has the effect of maintaining a simultaneous myopic-defocused retinal image created by light passing through the treatment zone Z2 of the lens.

In view of the disclosure herein, including the disclosure regarding the lens illustrated in FIG. 1, additional embodiments and aspects of the present lenses can be understood based on the following.

For example, an embodiment of the contact lenses comprises an optic part and a carrier part circumscribing the optic part. As used herein, the optic part of the contact lens may also be understood to be the optic zone of the contact lens, as understood by persons of ordinary skill in the art. The optic part of the contact lens comprises a vision correction area and a myopic defocus area. In one embodiment, the vision correction area constitutes at least 65% of the area of the optic part, and the myopic defocus area constitutes no more than 35% of the area of the optic part of the lens. These examples of contact lenses are particularly useful in children. It is known that in general, children's pupil sizes are relatively larger than adult pupil sizes. In these embodiments of the contact lenses the optic part of the lenses is larger than in contact lenses designed for correcting presbyopia in adults, such as adults over 40.

In certain embodiments, the vision correction area and myopic defocus area are concentrically arranged. An example of such a lens comprises a central zone, and the vision correction area comprises the central zone.

Any of the these embodiments of the contact lenses may comprise a vision correction area that constitutes at least 70% of the area of the optic part of the lens. In a further example, a contact lens may comprise a vision correction area that constitutes between 73% and 75% of the area of the optic part of the lens.

These embodiments of the contact lenses with a vision correction area that is at least 65% of the optic part of the lens, may have an optic part diameter that is greater than 7 mm and less than about 11 mm. For example, a contact lens may have an optic part diameter from about 8 mm to about 10 mm. In at least one embodiment, the optic zone diameter is about 9 mm.

As referred to previously, any of the preceding embodiments of contact lenses may have a vision correction area that has a negative refractive power and a myopic defocus area that has a refractive power that is less negative than the vision correction area refractive power.

Another embodiment of the contact lenses comprises an optic part and a carrier part circumscribing the optic part, and the optic part comprises a vision correction area and a myopic defocus area, and the optic part has a diameter greater than 7 mm and less than about 11 mm. In certain lenses, the optic part diameter is from about 8 mm to about 10 mm. For example, in one embodiment, the optic zone diameter is about 9 mm.

In any of the contact lenses referred to in the preceding paragraph, the vision correction area can have a negative refractive power, and the myopic defocus area has a refractive power that is less negative than the vision correction area refractive power. In certain embodiments, such as lenses configured for persons without pre-existing myopic refractive error, the correction area has a refractive power of 0 diopters, or has a low positive power, such as up to +2 diopters, and the myopic defocus area has a more positive focal power.

Further, in some embodiments of these contact lenses, the vision correction area constitutes at least 70% of the area of the optic part of the lens.

Another embodiment of the contact lenses comprises, consists essentially of, or consists of an optic part and a carrier part circumscribing the optic part. The optic part comprises, consists essentially of, or consists of a central zone having a negative refractive power, a myopic defocus first annular zone circumscribing the central zone and having a refractive power that is less negative than the central zone refractive power, a vision correcting first annular zone circumscribing the first myopic defocus zone and having a refractive power substantially equal to the central zone refractive power; a myopic defocus second zone circumscribing the first vision correcting annular zone and having a refractive power that is less negative than the central refractive power, and a second vision correcting annular zone circumscribing the second myopic defocus zone and having a refractive power that is substantially equal to the central zone refractive power. The optic part of the lens has a diameter from about 8 mm to about 10 mm, and at least 70% of the area of the optic part is the central zone, the first vision correcting annular zone, and the second vision correcting annular zone. In at least one of these embodiments, each of the first and second myopic defocus zones has a refractive power of 0 diopters.

The foregoing lenses, alone or as a pair of contact lenses, can be used in a method of treating or slowing progression of myopia in a person, such as a child. Also, particularly if the person is a child, a child may be treated with the lens or lenses, with the zone(s) of the correction part of the lens having a neutral or low positive focal power, if the child is non-myopic but predisposed to developing myopia. For example, the child may have or had two biological parents who had myopia. Or the child may be someone who primarily participates in near vision activities, such as by reading, writing/drawing, playing video games and the like. The present methods comprise a step of providing the present lenses. In one embodiment, the contact lenses are provided from a contact lens manufacturer to a contact lens distributor, a contact lens manufacturer to an optometrist, or from an optometrist to a patient.

The following trial description further illustrate the invention:

Trial

Children were enrolled in a clinical trial of one form of the lens of the invention to test its efficacy in slowing myopia progression.

Methods

The trial was a 20-month prospective, comparative, paired-eye study with cross-over. Initially, the treatment (dual-focus) lens of the invention was randomly assigned to the dominant or non-dominant eye of children in the trial, while their fellow (paired) eye acted as an internal control and wore a standard single vision lens. Lenses were worn at least eight hours/day for ten months. After 10 months, the lenses (dual focus and standard single vision lenses) were switched (crossed-over) between eyes and worn for a further 10 months. The cross-over was aimed at reducing the likelihood of treatment-induced anisometropia, due to a slower rate of myopia progression in the treatment versus the control eye.

Sample Size

The null hypothesis was that wearing dual-focus contact lenses had no effect on the rate of myopia progression in 12-14 year old children.

Sample size calculations were based on the assumption of 90% power and $\alpha=0.01$, using an intra-subject standard deviation of 0.26 Dioptres (D) for cycloplegic autorefraction, a required difference between means of 0.25 D, and a paired-eye, cross-over design. Calculations were conducted at the Harvard University Sample Size Calculator website http://hedwig.mgh.harvard.edu/sample_size.html. An estimated drop-out rate of 15% was assumed, to allow for some subjects who may not tolerate contact lens wear and others who may be lost to follow-up. A total of 40 subjects were recruited.

Study Measurements

Baseline and outcome measures were performed by an examiner who was blinded to the lens assignment of the participants. Outcome measurements were made of eye size and myopic refractive error every five months over a 20 month period. In each case, cycloplegia was induced with 2 drops of 1% tropicamide, 5 mins apart. After a delay of 30 mins, axial eye length and refractive error measures were made using partial coherence interferometry (Zeiss IOLMaster) and cycloplegic autorefraction (HARK-599).

Participants

Children with myopia were included if: aged 12-14 years; showed a recent myopic change of refraction greater than about 0.50 D/year; visual acuity of 6/6 or better; prepared to wear contact lenses full-time for the duration of the study; have the ability to handle and care for contact lenses without parental assistance; able to give informed assent (children) and informed consent (parent/guardian). Children were excluded if they had: any ocular pathology; abnormal binocular vision; anisometropia>1.00 D; astigmatism>0.75 D; systemic disease with ocular complications; ocular surface disease that would preclude contact lens wear.

Randomisation

Participants were randomly assigned to wear either (1) the dual focus lens of the invention in their dominant eye or (2) the standard single vision lens in their dominant eye, for the first ten month period. Subjects were stratified according to the prognostic factors of gender (male and female) and ethnicity (East Asian and non-East Asian) using a computer generated block-randomization programme (Clinstat, St George's Hospital Medical School, www.sgul.ac.uk/depts/phs/staff/jmb/jmbsoft/htm). The investigators and assessors responsible for the clinical care and outcome measures had no access to the randomization schedule throughout the study.

Outcome Measures

The primary outcome measure was rate of change in axial myopia in the treatment eye compared with the control eye. To measure changes in axial myopia it was necessary to measure both changes in refraction (with cycloplegic autorefraction) and changes in axial length of the eye (with partial coherence interferometry). Cycloplegic autorefraction was performed using a Humphrey Auto-Refractor (Humphrey HARK-599) and axial length measurements of the eyes were made with partial coherence interferometry (Zeiss IOLMaster), both non-invasive, highly repeatable methods.

Trial Results

Trial Results are shown in Tables 2.1 and 2.2 below and FIGS. 2.1 and 2.2:

TABLE 2.1

Myopia progression in eyes wearing DF contact lenses of the invention (DF lenses) compared to progression in eyes wearing Single Vision (SV) contact lenses. Myopia progression is measured as change in Spherical Equivalent Refraction (SER) (units = Dioptres) over a 10 month period. Data is for 30 children (age 11-14 years) enrolled in the clinical trial and shows that the mean progression in eyes wearing DF lenses (−0.40 D) is significantly slower (P = 0.000104) than in eyes wearing SV lenses (−0.68 D) over the same period.

Myopia Progression Data

| Participant | Wear Time (mo) | SV Eye. Baseline SER (D) | SV Eye. 10 mo SER (D) | SV Eye. Change in SER (D) | DF Eye. Baseline SER (D) | DF Eye. 10 mo SER (D) | DF Eye. Change in SER (D) |
|---|---|---|---|---|---|---|---|
| 1 | 10.33 | −2.06 | −2.64 | −0.58 | −2.10 | −2.43 | −0.34 |
| 2 | 10.37 | −4.41 | −5.52 | −1.11 | −4.05 | −4.65 | −0.60 |
| 3 | 10.57 | −2.02 | −2.69 | −0.66 | −2.32 | −2.62 | −0.30 |
| 4 | 10.50 | −3.43 | −4.23 | −0.80 | −3.28 | −3.82 | −0.54 |
| 5 | 11.20 | −2.31 | −2.75 | −0.45 | −2.51 | −2.75 | −0.24 |
| 6 | 10.33 | −4.25 | −5.47 | −1.23 | −3.58 | −4.25 | −0.66 |
| 7 | 11.47 | −0.40 | −1.36 | −0.96 | −0.70 | −1.12 | −0.42 |
| 8 | 10.37 | −3.37 | −3.36 | 0.01 | −3.18 | −3.11 | 0.07 |
| 9 | 10.10 | −1.97 | −2.59 | −0.62 | −2.40 | −2.51 | −0.11 |
| 10 | 10.13 | −2.11 | −2.65 | −0.54 | −1.84 | −2.05 | −0.21 |
| 11 | 10.10 | −1.25 | −2.04 | −0.79 | −1.59 | −1.99 | −0.40 |
| 12 | 9.90 | −3.75 | −4.67 | −0.92 | −3.90 | −4.32 | −0.43 |
| 13 | 10.30 | −4.72 | −4.71 | 0.01 | −4.93 | −5.02 | −0.09 |
| 14 | 10.87 | −4.61 | −4.59 | 0.02 | −4.58 | −4.90 | −0.31 |
| 15 | 11.47 | −2.27 | −2.82 | −0.55 | −1.82 | −2.09 | −0.26 |
| 16 | 11.07 | −2.49 | −2.67 | −0.19 | −2.58 | −2.71 | −0.13 |
| 17 | 9.47 | −1.97 | −2.16 | −0.19 | −2.17 | −2.25 | −0.07 |
| 18 | 10.57 | −3.06 | −3.55 | −0.49 | −3.01 | −3.17 | −0.16 |
| 19 | 9.87 | −1.90 | −3.22 | −1.33 | −2.17 | −3.02 | −0.85 |
| 20 | 10.57 | −2.01 | −2.35 | −0.34 | −2.42 | −2.35 | 0.08 |
| 21 | 11.03 | −1.40 | −1.88 | −0.49 | −1.57 | −1.79 | −0.22 |
| 22 | 10.50 | −1.50 | −2.20 | −0.70 | −1.07 | −1.72 | −0.65 |
| 23 | 11.27 | −2.40 | −2.95 | −0.55 | −2.27 | −2.40 | −0.12 |
| 24 | 10.30 | −4.91 | −6.48 | −1.58 | −4.97 | −6.37 | −1.40 |
| 25 | 11.60 | −2.75 | −4.17 | −1.42 | −3.11 | −4.36 | −1.25 |
| 26 | 10.73 | −2.26 | −3.45 | −1.19 | −2.71 | −3.26 | −0.55 |
| 27 | 11.50 | −4.41 | −5.40 | −0.99 | −4.58 | −4.90 | −0.31 |
| 28 | 10.67 | −2.93 | −3.45 | −0.52 | −2.57 | −3.24 | −0.67 |
| 29 | 10.63 | −2.91 | −3.74 | −0.83 | −2.71 | −3.16 | −0.45 |
| 30 | 10.27 | −1.27 | −1.81 | −0.54 | −1.42 | −1.91 | −0.48 |
| mean | | | | −0.68 | | | −0.40 |
| St Dev | | | | 0.42 | | | 0.34 |

TABLE 2.2

Axial eye elongation in eyes wearing DF contact lenses compared to elongation in eyes wearing Single Vision (SV) contact lenses. Eye Elongation is measured as change in Axial Length (AXL) (shown in mm) over a (nominal) 10 month period. Data is for the 30 children (age 11-14 years) enrolled in the clinical trial and shows that the mean increase in eye length in eyes wearing DF lenses (0.099 mm) is significantly slower (P = 0.000273) than in eyes wearing SV lenses (0.193 mm) over the same period.

Axial eye elongation data

| Participant | Wear Time (mo) | SV Eye. Baseline AXL (mm) | SV Eye. 10 mo AXL (mm) | SV Eye. Change in AXL (mm) | DF Eye. Baseline AXL (mm) | DF Eye. 10 mo AXL (mm) | DF Eye. Change in AXL (mm) |
|---|---|---|---|---|---|---|---|
| 1 | 10.33 | 24.014 | 24.235 | 0.221 | 23.989 | 24.125 | 0.137 |
| 2 | 10.37 | 26.209 | 26.475 | 0.265 | 26.010 | 26.029 | 0.019 |
| 3 | 10.57 | 23.745 | 23.957 | 0.212 | 23.999 | 24.004 | 0.005 |
| 4 | 10.50 | 24.714 | 24.796 | 0.082 | 24.590 | 24.961 | 0.372 |
| 5 | 11.20 | 23.969 | 24.094 | 0.124 | 23.797 | 23.718 | −0.079 |
| 6 | 10.33 | 25.546 | 25.795 | 0.248 | 25.341 | 25.523 | 0.182 |
| 7 | 11.47 | 25.335 | 25.602 | 0.267 | 25.429 | 25.607 | 0.178 |
| 8 | 10.37 | 23.412 | 23.521 | 0.108 | 23.314 | 23.396 | 0.082 |
| 9 | 10.10 | 23.573 | 23.720 | 0.147 | 23.700 | 23.762 | 0.062 |
| 10 | 10.13 | 24.167 | 24.449 | 0.282 | 24.378 | 24.442 | 0.063 |
| 11 | 10.10 | 24.499 | 24.780 | 0.281 | 24.506 | 24.599 | 0.094 |
| 12 | 9.90 | 25.135 | 25.470 | 0.336 | 25.217 | 25.150 | −0.067 |
| 13 | 10.30 | 24.521 | 24.604 | 0.083 | 24.368 | 24.636 | 0.268 |
| 14 | 10.87 | 24.820 | 25.046 | 0.226 | 25.020 | 25.150 | 0.130 |
| 15 | 11.47 | 23.521 | 23.694 | 0.172 | 23.402 | 23.491 | 0.089 |
| 16 | 11.07 | 24.259 | 24.357 | 0.098 | 24.214 | 24.276 | 0.061 |
| 17 | 9.47 | 24.025 | 24.023 | −0.002 | 24.189 | 24.090 | −0.099 |
| 18 | 10.57 | 24.394 | 24.567 | 0.173 | 24.154 | 24.252 | 0.098 |
| 19 | 9.87 | 23.583 | 23.985 | 0.402 | 23.694 | 23.918 | 0.224 |
| 20 | 10.57 | 23.441 | 23.523 | 0.082 | 23.650 | 23.786 | 0.136 |
| 21 | 11.03 | 23.892 | 24.073 | 0.182 | 24.061 | 24.192 | 0.131 |
| 22 | 10.50 | 25.224 | 25.364 | 0.140 | 24.969 | 25.006 | 0.037 |
| 23 | 11.27 | 24.367 | 24.480 | 0.113 | 24.190 | 24.175 | −0.014 |
| 24 | 10.30 | 24.502 | 24.705 | 0.202 | 24.524 | 24.622 | 0.098 |
| 25 | 11.60 | 24.454 | 24.631 | 0.177 | 24.538 | 24.705 | 0.167 |
| 26 | 10.73 | 23.964 | 24.122 | 0.158 | 24.055 | 24.123 | 0.067 |
| 27 | 11.50 | 25.052 | 25.459 | 0.407 | 25.099 | 25.315 | 0.216 |
| 28 | 10.67 | 24.059 | 24.230 | 0.172 | 24.086 | 24.192 | 0.106 |
| 29 | 10.63 | 24.424 | 24.617 | 0.193 | 24.343 | 24.414 | 0.071 |
| 30 | 10.27 | 24.360 | 24.604 | 0.244 | 24.663 | 24.792 | 0.129 |
| mean | 10.601 | | | 0.193 | | | 0.099 |
| St Dev | 0.532 | | | 0.094 | | | 0.100 |

Figure 2A:
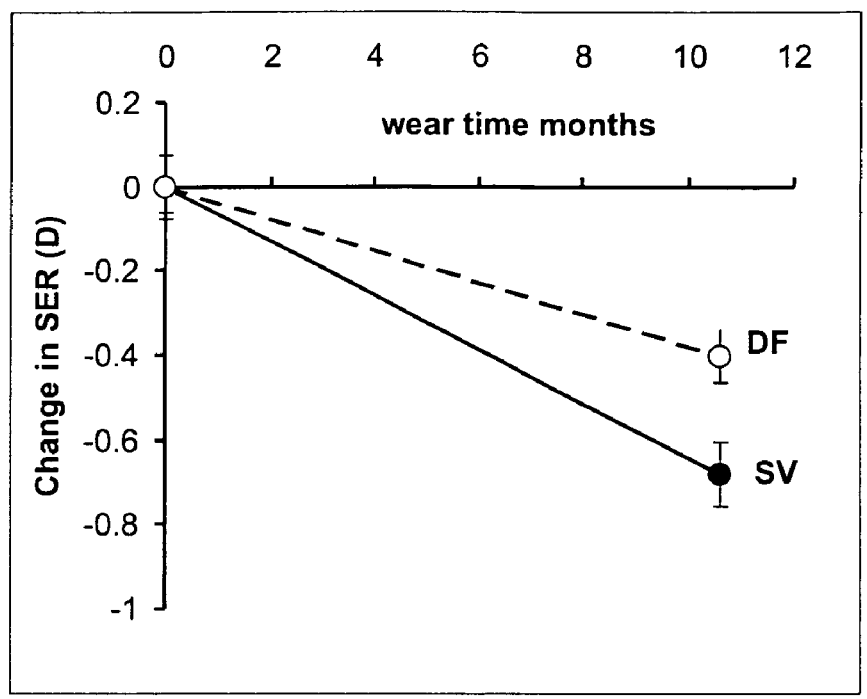
FIG. 2a is a graphical summary of the data presented subsequently in Table 1, FIG. 2b a graphical summary of the data presented subsequently in Table 2.1.

FIG. 2a is a graphical summary of the data presented in Table 2.1, showing that myopia progression is significantly reduced in eyes wearing DF lenses of the invention compared to eyes wearing SV lenses over the same period. Error bars show standard error of the mean.

Figure 2B:
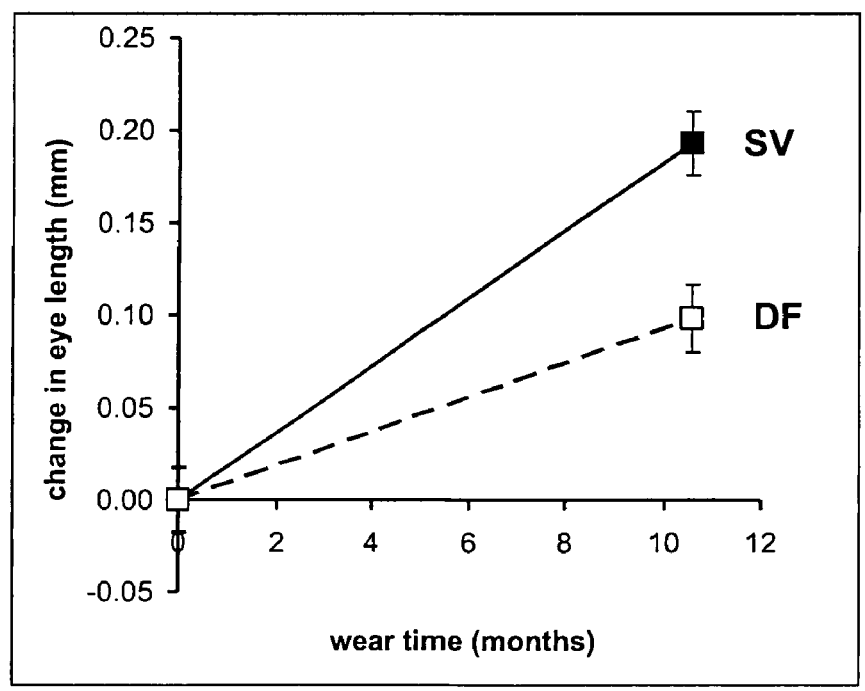

FIG. 2b is a graphical summary of the data presented in Table 2.2, showing that axial elongation of the eye is significantly reduced in eyes wearing DF lenses of the invention compared to eyes wearing SV lenses over the same period. Error bars show standard error of the mean.

The foregoing describes the invention including preferred forms thereof. Alternations and modifications as well be obvious to those skilled in the art are intended to be incorporated therein as defined in the accompanying claims.

The invention claimed is:

1. A contact lens including a vision correction area having a negative focal power to correct the myopic vision of a wearer to present a clear image to the wearer during distance viewing, and during near viewing with accommodation by the eye during near viewing; and a myopic defocus area having a focal power which is less negative than the negative focal power of the vision correcting area to also simultaneously present a myopic defocused image during both distance and near viewing, with said accommodation by the eye during near viewing, wherein the vision correction area comprises a central zone of the contact lens, said central zone having a diameter of at least 2.5 mm, and the myopic de-focus area comprises a second zone around said central zone.

2. A contact lens according to claim 1, wherein the focal power of said myopic defocus area of the lens is up to 5 dioptres less negative than the focal power of the vision correction area.

3. A contact lens according to claim 1, wherein the diameter of said second zone is at least 3.3 millimeters.

4. A contact lens according to claim 1, wherein said second zone is surrounded by a third zone which comprises part of said vision correction area.

5. A contact lens according to claim 4, wherein the diameter of the third zone is less than about 5.8 millimeters.

6. A contact lens according to claim 1, wherein the vision correction area comprises at least about 65% of the operative optic area of the lens.

7. A contact lens, including
a vision correction area having a first focal power, the vision correction area comprising a central zone of the contact lens having a diameter of at least 2.5 mm; and
a myopic defocus area having a second focal power that is less negative than the first focal power, the myopic defocus area comprising an annular zone circumscribing the central zone and dimensioned to simultaneously provide a de-focused retinal image located in front of a retinal image provided by the vision correction area over a single retinal area to slow myopia progression of a wearer of the contact lens.

8. A contact lens according to claim 7, wherein the focal power of said myopic defocus area of the lens is up to 5 dioptres less negative than the focal power of the vision correction area.

9. A contact lens according to claim 7, wherein the diameter of said annular zone is at least 3.3 millimeters.

10. A contact lens according to claim 7, wherein said annular zone is surrounded by a third zone which comprises part of said vision correction area.

11. A contact lens according to claim 10, wherein the diameter of the third zone is less than about 5.8 millimeters.

12. A contact lens according to claim 7, wherein the vision correction area comprises at least about 65% of the operative optic area of the lens.

13. A contact lens according to claim 7, wherein the vision correction area comprises at least about 70% of the operative optic area of the lens.

14. A contact lens according to claim 7, wherein the vision correction area comprises between about 72 and about 80% of the operative optic area of the lens.

15. A contact lens according to claim 7, wherein the operative optic part of the lens has a diameter between about 8 and about 10 millimeters.

16. A contact lens according to claim 7, wherein the operative optic part of the lens has a diameter of at least about 8.5 millimeters.

* * * * *